Aug. 21, 1962 P. J. TRAFTON 3,050,067
SUN TAN DEVICE
Filed Feb. 4, 1959 3 Sheets-Sheet 1
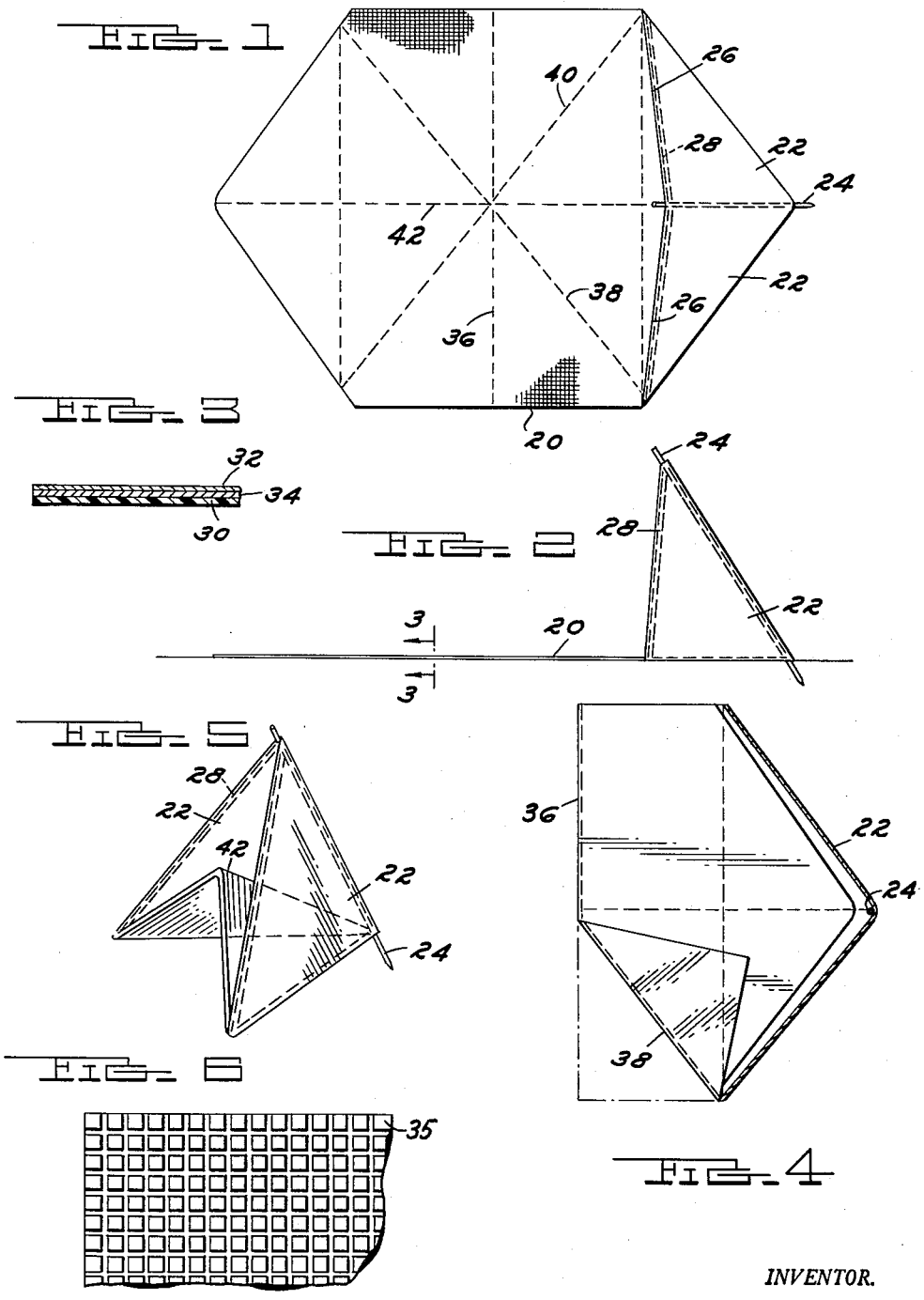
INVENTOR.
PAROLLEE J. TRAFTON
BY
Burton E Parker

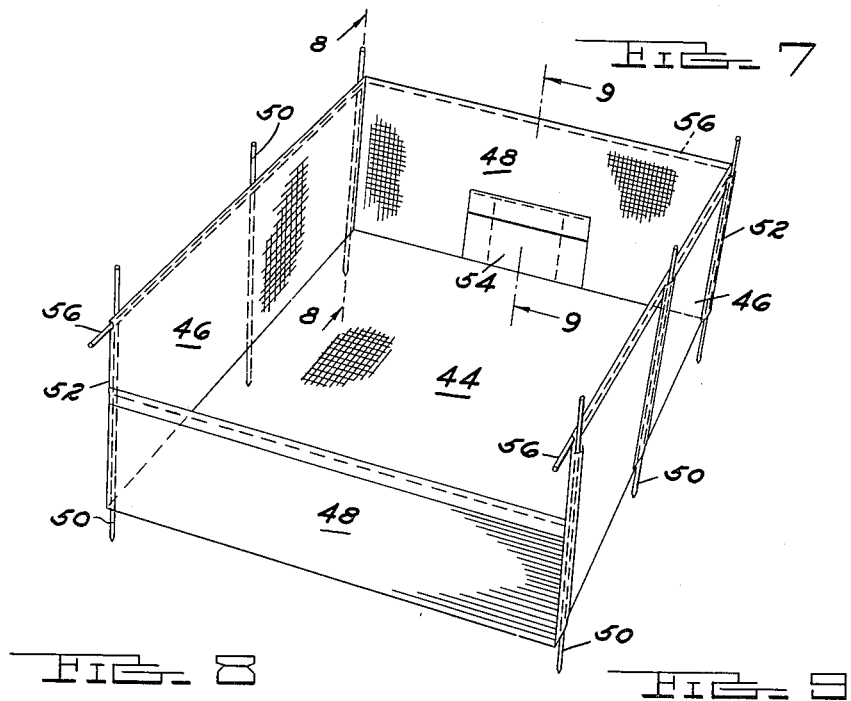
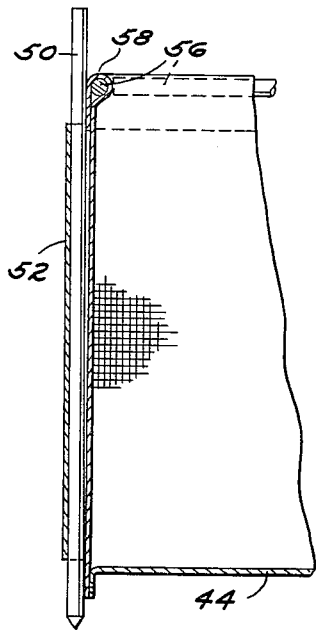
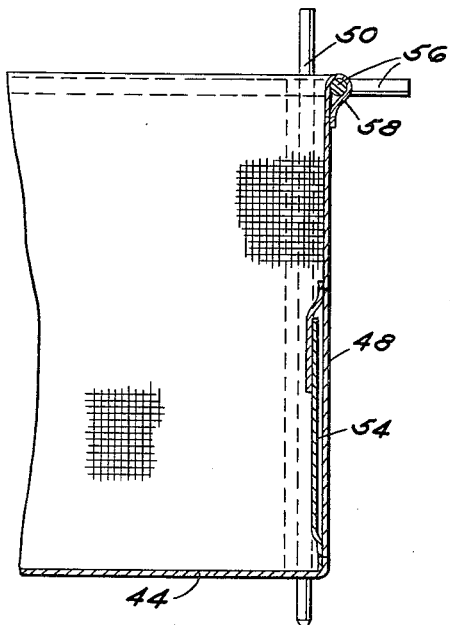

Aug. 21, 1962 P. J. TRAFTON 3,050,067
SUN TAN DEVICE
Filed Feb. 4, 1959 3 Sheets-Sheet 3
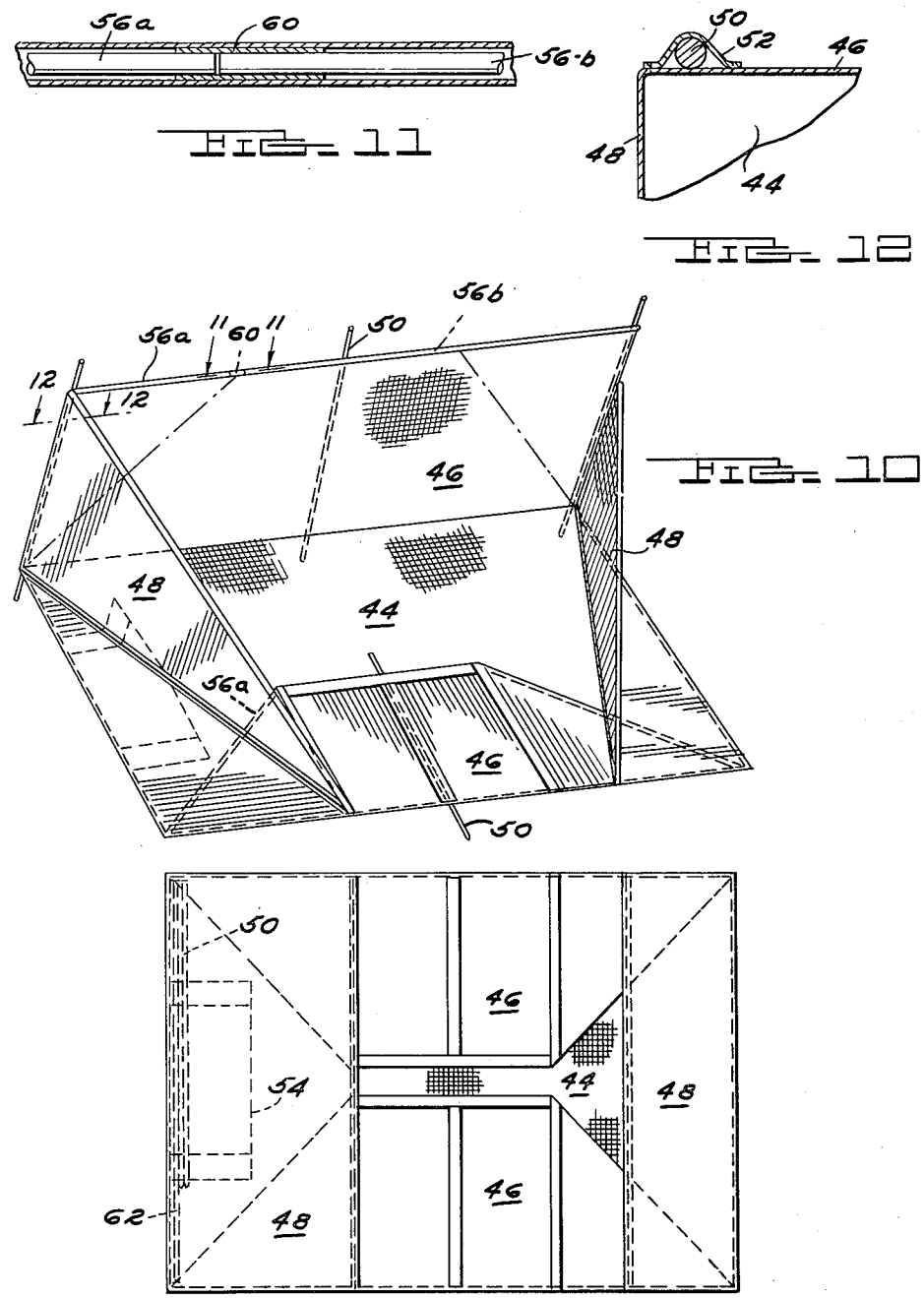
INVENTOR.
PAROLLEE J. TRAFTON
BY
Burton & Parker
ATTORNEYS

United States Patent Office 3,050,067
Patented Aug. 21, 1962

3,050,067
SUN TAN DEVICE
Parollee J. Trafton, 631 Westchester Road,
Grosse Pointe, Mich.
Filed Feb. 4, 1959, Ser. No. 791,193
7 Claims. (Cl. 128—372)

This invention relates to a suntan platform support and/or enclosure adapted for the use of persons or other living objects.

An object is to provide a simple, inexpensive suntan platform or device adapted for the use of persons and so constructed and arranged that an individual resting thereupon not only receives direct sun rays upon the individual's body but receives upon portions of his body exposed in opposition to the reflective surface of the device reflected sun rays.

Another object is the provision of a suntan device of the character described which exhibits an upper surface exposed to the sunlight, which upper surface exhibits a multiplicity of relatively angularly disposed sunlight reflective surface areas whereby the rays of the sun falling on such surface are reflected at a multiplicity of different angles upon a person occupying such device.

Another object is the provision of a suntan device of the character hereinabove set forth formed of a plurality of layers of material, one being an intermediate layer of a bright sunlight reflective character, and another being a relatively transparent plastic layer overlying the reflective layer and completely protecting and covering the sunlight reflective layer so that the sunlight reflective surface of the intermediate layer is protected against exposure to dirt and the atmosphere and thereby permanently retains its bright sunlight reflective character.

A meritorious feature consists in the fact that the pastic layer which overlies the sunlight reflective layer is of a plastic material adapted to absorb the shorter rays of sunlight and thereby minimize the normal tendency to sunburn the person occupying the reflective platform.

Another meritorious feature is that the upper surface of the platform upon which the user rests, which is the transparent plastic layer, presents a suitable support for the user and does not become uncomfortably hot to the touch. When such platform is surrounded by side walls, as hereinafter described, having reflective inner surfaces similar to the reflective upper surface of the platform itself, the temperature within the enclosure is such that it may be used by a person in the winter time upon sunshiny but relatively cold days, for the temperature within the enclosure is very substantially higher than the temperature outside of the enclosure. Such a device provided with a platform having an upper reflective surface and a side wall having an inner reflective surface may be so disposed with respect to the sun as to direct reflected rays over the user's body in addition to the direct rays falling thereon.

A further object is the provision of a suntan device of the character described which is formed of a flexible laminated material and is so constructed as to include side walls so arranged as to reflect sun rays onto a person occupying the platform, and which device is so constructed as to be capable of being folded up when not in use into a rleatively small packet.

Another meritorious feature is that the multi-sheet material which makes up the platform and the side walls of the enclosure comprises two outer protective moisture-resistant plastic layers between which is sandwiched a bright metallic sun-light reflective layer, and the upper outer plastic layer of the platform and the inner surface layer of the side walls are transparent so that the sun-light reflective layer receives and reflects the sun's rays therethrough. Furthermore, the laminated sheet is preferably embossed so that the bright sunlight reflective layer presents a multiplicity of relatively angularly disposed sunlight reflective planar surfaces.

Other objects, advantages, and meritorious features will more fully appear from the specification, claims, and accompanying drawings, wherein:

FIG. 1 is a plan of a suntan platform device embodying my invention;

FIG. 2 is a side elevation of the suntan platform device shown in FIG. 1;

FIG. 3 is a cross sectional view taken on line 3—3 of FIG. 2;

FIG. 4 is a plan partly in section of the structure shown in FIGS. 1 and 2 in an early stage of its being folded into a compact form;

FIG. 5 is a perspective of the structure shown in FIGS. 1, 2, and 4 showing the same in a later stage of its being completely folded into a small packet;

FIG. 6 is a view showing the embossed character of the multiply sheet which is used in forming the structure;

FIG. 7 is a perspective of a modified form of the structure as shown in FIGS. 7–13;

FIG. 8 is a sectional view taken on the line 8—8 of FIG. 7;

FIG. 9 is a sectional view taken on the line 9—9 of FIG. 7;

FIG. 10 is a perspective showing the structure of FIG. 7 in the process of being folded up into a packet form;

FIG. 11 is a fragmentary cross sectional view taken on the line 11—11 of FIG. 10;

FIG. 12 is a fragmentary cross sectional view taken on the line 12—12 of FIG. 10;

FIG. 13 is a plan of the structure shown in FIG. 10 at a further stage of its being folded into packet form and ready to be rolled up into a roll.

The embodiment of this invention shown in FIGS. 1–5 is a form of the platform enclosure which might be termed a tepee type of device. It comprises a floor 20 and a side wall or hood 22. The floor is of a generally elongate shape having a rectangular center area and opposite tapered end areas as shown particularly in FIG. 1. Associated with one end area are two generally triangular generally upright complementary side walls 22.

These side walls extend upwardly and somewhat inwardly from the margins of the tapered end of the floor, to partially overhang the floor. These side walls 22 meet along the linear median line of the floor and a tubular part is provided along such median line through which a supporting stake 24 is removably receivable. The lower end of this stake is adapted to be driven into the ground as shown in FIG. 2 to hold the side walls 22 angularly upright. The margins 26 of the side walls exhibit tubular seams and within each tubular seam is received a strut or support 28 as shown in dotted line in FIGS. 1, 2, and 5.

This suntan platform device represents only a partial enclosure for the person occupying it. In other words, if an occupant lies upon the floor 20 with his head underneath the hood-like structure formed by the side walls 22, it would be only the head and the adjacent upper portion of the body that would be protected by such side walls against wind or the like. Inasmuch, however, as the upper surface of the floor and the inner portion of the side wall portion are of a sunlight reflective character, the reflected rays of the sun from the side walls, due to their angular disposition, will strike the exposed portion of the body of the occupant of the floor down as far as the waist.

The material of which the floor is formed and of which the side walls are formed, is a multiply, flexible sheetlike structure as shown in FIG. 3. There is a bottom protective layer of suitable material such as a heavy vinyl plastic layer, indicated by the numeral 30. There is an upper protective layer indicated by the numeral 32. This upper plastic layer may be formed of a polyester tough, strong, water-repellent, transparent, relatively chemically inert plastic sheet. One such plastic which has been found highly suitable is a polyethylene terephthalate resin, sold under the trade name of Mylar. Interposed between these two layers of plastic is a bright sunlight reflective metallic layer. This sunlight reflective layer may be formed of aluminum particles or other suitable sunlight reflective silver-like particles deposited in a suitable manner upon one surface of the layer 32. This sunlight reflective layer of metal particles 34 may be deposited upon the plastic in any suitable manner as by the vacuum process of deposit, which is well known.

In order to pick up the rays and to cause their reflection at a multiplicity of angles, the laminated sheet is embossed as shown in FIG. 6. This embossment produces a multiplicity of relatively angularly disposed small sunlight reflective planar surfaces 35 as determined by the embossment itself. Such embossment causes the rays to be reflected in a multiplicity of angular directions. The Mylar coating overlying the sunlight reflective metallic layer minimizes the tendency to sunburn. The plastic Mylar layer also has the capacity, it is believed, to absorb the shorter length sun rays as, for example, those below 3100 Angstrom units wave length, which shorter rays are believed to be the ones most productive of sunburn.

The intermediate bright metal reflective layer is completely protected on both sides by the plastic layers. The transparent upper layer 32, which is uppermost on the floor and which is innermost on the side walls, permits the sun's rays to be reflected therethrough, except for the shorter length rays that are absorbed, and is relatively cool to the touch. A person occupying this platform structure will not find the plastic layer unpleasantly hot to the touch. Such person may also so dispose his body that a large area of the underside of the body will receive sun rays reflected from the platform and side walls so that the suntan will not only be accomplished on the upper exposed portion of the body but throughout that area which is exposed only to the reflected rays.

The structure shown in FIGS. 1–5, which is the simplest, least expensive form of the structure, is adapted to be folded up into the shape indicated in FIG. 5. In other words, the end of the floor opposite the hood may be folded along the transverse line 36 as shown in FIG. 4. The floor may then have the corners folded over along lines 38 and 40 as shown in FIG. 4. The end having the folded-over corners may then be elevated and folded along the linear median line 42 as illustrated in FIG. 5. This will bring the floor into folded relationship between the two side walls 22 so that the same will comprise a generally triangular packet. The stake 24 could be withdrawn if desired but it may also be left in place as indicated in FIG. 5.

FIGS. 7–13 indicate a more complete enclosure type of suntan platform. The material is the same as heretofore described in connection with FIGS. 1–6. It is a flexible laminate consisting of the two protective plastic layers having the bright reflective metal layer sandwiched therebetween. The transparent protective Mylar layer will constitute the uppermost surface of the floor portion and the innermost surface of the side wall portion.

This construction of FIGS. 7–13 illustrates a generally rectangular arrangement wherein there is a rectangular floor 44, two opposite side walls 46, and two opposite end walls 48. The walls are adapted to be held in the upright position, as shown in FIG. 7, by stakes 50. These upright stakes 50 may be formed of wood, metal, or the like, and are removably receivable within tubular margins 52 formed on the outer surface of the side walls, as shown particularly in FIGS. 7, 8, and 12. These stakes may have pointed ends so that they can be driven into the ground if desired. One end portion of the rectangular construction is shown as of lower height in FIG. 7 to facilitate entry of a person into the enclosure. The opposite end portion is shown as provided with a pocket-like structure 54 adapted to contain whatever one wishes to place therein. The side wall of the enclosure is illustrated as provided with an upright stake 50 at each corner and each of the two sides 46 is shown as provided with an intermediate upright stake 50. These stake elements are all removable from their tubular portions.

The upper margins of the side walls and end walls are provided with supporting struts or rods 56 as shown in FIGS. 7, 8, and 9. These rigid struts may be formed of the same material as the stakes except that the ends need not be pointed. The ends 48 may have such struts 56 permanently secured therein within tubular margins such as 58 in FIGS. 8 and 9.

The marginal struts 56 received within the margins of the side walls are formed in two sections. There is a section 56a, which is a short section and is permanently received within its margin. There is a relatively long section 56b, which is removable from the opposite end of the tubular margin. This two-part marginal strut has one of its sections, such as 56b, provided with a tubular end part 60 secured thereto and projecting therebeyond. This tubular end part 60 is adapted to be telescopically received over the adjacent end of the short length of the strut 56a as shown in FIG. 11, so as to form a continuously rigid side wall strut.

The reason for this construction is that the long length portions 56b of these side walls struts may be removed. The short length portions may be carried by the side walls during the folding of the side walls so that the structure may be folded as shown in FIG. 13 and then rolled up. The long length portions 56b, together with the upright stakes 50, are withdrawn and placed within the folded laminated sheet as shown in FIG. 13 in dotted outline. The side walls and end walls are folded over as illustrated and the entire structure, after being folded flat as shown in FIG. 13, can then be rolled up into a roll, rolling from one end toward the other.

When the stakes 50 have been removed and the long length portions of the struts indicated as 56b have been removed, it will be seen that the two opposite side walls may be folded over the floor and the end wall adjacent to the short length of side wall struts 56a may be folded over the side walls along the diagonal lines. The marginal strut 56 in the end wall will then lie alongside the short length marginal struts 56a of the side walls, as will appear from FIG. 13. The opposite end wall is then similarly folded over the adjacent ends of the side walls and the folded flexible laminated structure may be rolled up from one end so that it can be placed within a tube or other similar small container. The short length 56a of the side wall strut has a length no greater than the height of the side wall so as to permit of this method of folding.

What I claim is:

1. A suntan platform provided with a floor comprising a flexible multi-layer sheet having a sunlight reflective intermediate layer interposed between two protective outer layers, one protective layer being a bottom layer and the other protective layer being a tough, relatively transparent and relatively thin plastic upper layer, said sunlight reflective layer comprising a multiplicity of bright metallic particles deposited upon and carried by that surface of the transparent plastic layer which juxtaposes the bottom layer, characterized in that the sunlight reflective layer and the transparent reflective upper layer are jointly embossed to present a multiplicity of relatively angularly disposed sunlight reflective surfaces each visible through its similar angularly disposed transparent plastic layer.

2. A suntan platform provided with a floor comprising a flexible multi-layer sheet having a sunlight reflective intermediate layer interposed between two protective outer layers, one protective layer being a bottom layer and the other protective layer being a tough, relatively transparent and relatively thin plastic upper layer, said floor portion provided with opposite side walls extending upwardly from opposite sides of the floor and comprising: a flexible multi-layer sheet having a sunlight reflective intermediate layer interposed between two protective layers, one protective layer being an outer surface layer and the other protective layer being an inner surface layer, said inner surface layer formed of tough relatively transparent thin plastic material said floor portion and said wall portions having their sunlight reflective layers and their transparent layers which underlie the reflective layers embossed into a plurality of small spaced-apart planar reflective surfaces.

3. A suntan platform enclosure as defined in claim 2 characterized in that the side wall extends completely about the margin of the floor and projects upwardly therefrom and is supported in such position.

4. A suntan platform as defined in claim 2 characterized in that the side wall forms a hood-like enclosure about one end of the floor and overhangs in part said end of the floor.

5. A suntan platform as defined in claim 2 characterized in that the floor and the side wall are each formed of flexible sheetlike material and the side wall is provided with rigid removable stakes and the floor and side wall are adapted to be folded together into a small packet, and said side wall each having a height not appreciably less than one-half the width of the floor.

6. A suntan platform provided with an elongate flexible floor having similar ends tapered from the linear side margins of the floor toward the linear median line of the floor, said floor having a bright sunlight reflective upper surface, said platform provided at one end with a pair of complementary upright triangular side walls extending upwardly from the two margins of the tapered end to a meeting line of said two triangular side walls and a supporting strut extending along the outer margin of each triangular side wall, each triangular side wall having a bright sunlight reflective upper surface, each sunlight reflective surface consisting of a sunlight reflective layer overlaid on its upper surface by a substantially transparent plastic layer and said two layers which constitute the sunlight reflective surface characterized as consisting of a multiplicity of relatively angularly disposed planar reflective surfaces said floor provided with two transverse fold lines and two diagonal fold lines and a median linear fold line whereby it may be folded into place between the two triangular side walls and into a triangular folded shape.

7. A suntan platform enclosure comprising a substantially rectangular floor of flexible laminated sheet material having a sunlight reflective intermediate layer sandwiched between two protective layers, one protective layer being a bottom layer and the other protective layer being an upper layer of tough relatively transparent plastic; a wall extending completely about the four sides of the floor and projecting upwardly therefrom and having two side walls and two end walls, said wall formed of flexible laminated sheet material having a sunlight reflective intermediate layer sandwiched between two protective layers, one protective layer being an inner layer of tough relatively transparent plastic; said wall provided with transverse tubular elements and rigid stakes extending removably through said elements and adapted to support the wall, said wall also provided with a tubular upper margin, rigid frame struts disposed within said tubular margin, the rigid frame struts disposed within the tubular margin of the two opposite side walls being formed in two pieces and at least one of the pieces being removable from the margin and capable of being telescopically coupled with the other piece within the tubular margin, said other piece of said edge side wall strut having a length not greater than one-half of the width of the floor.

References Cited in the file of this patent
UNITED STATES PATENTS

| | | |
|---|---|---|
| 1,669,484 | Mowry | May 15, 1928 |
| 1,974,820 | Krell | Sept. 25, 1934 |
| 2,626,609 | Friedberg | Jan. 27, 1953 |
| 2,675,807 | Pursell | Apr. 20, 1954 |

FOREIGN PATENTS

| | | |
|---|---|---|
| 446,247 | Great Britain | July 13, 1934 |
| 785,447 | France | May 20, 1935 |
| 1,043,801 | France | Nov. 12, 1953 |